Patented Aug. 20, 1940

2,212,034

UNITED STATES PATENT OFFICE 2,212,034

CATALYTIC DEHYDROGENATION OF HYDROCARBONS

Jacque C. Morrell and Aristid V. Grosse, Chicago, Ill., assignors to Universal Oil Products Company, Chicago, Ill., a corporation of Delaware No Drawing. Application April 30, 1938
Serial No. 205,369

10 Claims. (Cl. 260—683)

This invention refers more particularly to dehydrogenation of paraffinic hydrocarbons to produce corresponding mono-olefins therefrom, the latter compounds being of a more active character permitting their employment in various reactions to which paraffins are not adapted such as, for example, the formation of higher molecular weight compounds by polymerization reactions.

More specifically the invention is concerned with the use in primary dehydrogenation reactions of specific types of catalysts which have been found to accelerate the desired reactions more or less selectively.

When paraffin hydrocarbons are heated to the point where they begin to decompose there is a certain amount of simple dehydrogenation reactions in which two hydrogen atoms are lost from two carbon atoms and the corresponding olefin results. However this type of reaction is accompanied in the absence of specific catalysts by a large number of side reactions including ruptures of the carbon-carbon bonds and recombinations of the originally formed radicals, the proportions of the various reactions which occur depending upon the molecular weight and structure of the paraffin or paraffin mixtures treated and the severity of the conditions employed. Usually the amount of side reactions occurring when a practical amount of dehydrogenation is obtained at an elevated temperature more than over-balances the dehydrogenation reactions so that losses are too great and the process is not economical. Numerous catalysts have been developed to accelerate the desired primary dehydrogenation reactions and permit obtaining yields of mono-olefins, and the present invention is a contribution to this catalytic field.

In one specific embodiment the present invention comprises a process for dehydrogenating paraffin hydrocarbons to form the corresponding mono-olefins therefrom which comprises contacting said paraffin hydrocarbons at suitably elevated temperatures with granular catalysts consisting of an alumina-silica base supporting minor amounts of oxides of tin.

In a further embodiment the preferred catalyst may be employed to produce di-olefins by the simple dehydrogenation of the corresponding mono-olefins.

The present type of catalyst consists of a major proportion of a highly porous and at the same time refractory base material supporting a minor proportion of tin oxides, the latter furnishing the greater proportion of the total catalytic effect. The base materials which are essentially the supports for the more active tin oxide catalysts may be prepared by a number of methods and may consist of alumina-silica complexes in which the molal ratios of the two oxides vary over a considerable range. The catalysts are preferably prepared so that there are substantially no contaminating compounds present such as the alkali metal salts which may be occluded or adsorbed during the original precipitations. In other words the preferred catalysts consist essentially only of alumina-silica complexes and tin oxides, the last named being in a highly dispersed condition on the surface and in the pores of the alumina-silica granules to furnish extended surfaces for catalytic action.

In the following paragraphs brief summaries are given of the methods which may be employed to form the alumina-silica carriers and to add the tin oxides. It is to be understood in general that the alumina-silica composites which may be looked upon more or less in the light of synthetic silicates may be prepared either by co-precipitation or by separate precipitation and mixing of the alumina and silica, the original hydrated composite being calcined to remove water, ground and sized before the necessary tin oxides are added and that the invention also comprises the concurrent or subsequent precipitation of tin hydroxides on the alumina-silica base material in aqueous suspension.

1. Solutions of soluble alkali metal silicates and soluble aluminum salts, the latter including soluble aluminates, may be mixed in varying proportions to jointly precipitate hydrated alumina and hydrated silica in varying proportions. The general reaction in this method of forming alumina silica complexes is illustrated below:

$$2AlCl_3 + Na_2SiO_3 + 3H_2O \rightleftarrows Al_2O_3 \cdot SiO_2 \cdot H_2O + 2NaCl + 4HCl$$

In this case stannic or stannous chloride may be present in the solution and its precipitation in and on the hydrated alumina-silica precipitation be accomplished by the addition of requisite amounts of some alkali such as sodium hydroxide or sodium carbonate. However, a better method is to form alumina-silica complexes separately and wash the primary precipitate thoroughly with hydrochloric acid, ammonium chloride, or aluminum chloride to displace adsorbed alkali metals so that the base material is substantially free from contaminating compounds. In this case, after calcining, grinding, and sizing, the particles are added to a solution of a tin salt and tin hydroxides are precipitated by the addition of the alkaline reagents after which the hydroxides are dehydrated at minimum temperatures to avoid decomposition of the tin oxides.

2. Hydrated silica and hydrated alumina may be separately precipitated and the precipitates mixed in the wet condition. In the case of silica a convenient method is to acidify a solution of an alkali metal silicate to precipitate a silica gel. In the case of alumina the desired hydroxide may be precipitated by the addition of alkalis particularly ammonium hydroxide although other precipitants such as ammonium carbonate, ammonium hydrosulfide or ammonium sulfide may be employed. Base carrying materials made in this manner may be mixed directly with stannous hydroxide or stannic acid in the wet condition or added to solutions of tin salts and the hydrated tin oxides precipitated as under section 1.

3. A separately precipitated hydrated silica may be added to an aqueous solution of an aluminum salt and the hydrated alumina precipitated in the presence of the suspended silica by the addition of alkaline precipitants. In this case the precipitation of alumina may be conducted in a solution containing also a soluble tin salt and by using a sufficient excess of alkaline precipitant the tin hydroxides may be in a sense co-precipitated with the aluminum hydroxide so that a very intimate mixing is obtained. Alternatively, the formation of the alumina-silica base may be conducted separately and the tin oxides added subsequently.

4. A separately precipitated hydrated alumina may be added to an alkali metal silicate and the silica precipitated in the presence of the alumina by the addition of just the required amount of acid which is insufficient to redissolve the alumina. After the formation of the alumina-silica mass by this method, the tin oxides may be added by any of the methods described in the preceding section.

It can be seen from the above that any method of obtaining a primary mix of hydrated silica and hydrated alumina may be employed within the scope of the invention to produce carriers for tin oxide and precipitate tin hydroxides thereon which may be converted to oxides by dehydration, although obviously the character and efficiency of the ultimately prepared alumina-silica-tin oxide masses will vary somewhat with the exact conditions of precipitation and/or mixing, the ratio of alumina to silica, and the amount of the tin oxides present.

Among the soluble compounds of tin which may be employed as a source of tin hydroxides, the halides, both stannous and stannic, may be mentioned and also stannous sulfate. Other compounds such as di-methyl stannic fluoride having the formula $(CH_3)_2SnF_2$ and various tetra alkyl ammonium stannates may be employed.

Catalysts of the present character are best employed as granular filler in exteriorly heated treating chambers which may consist of banks of relatively small diameter tubes in parallel connection to permit high heat transfer rates and supply the necessary heat for the endothermic dehydrogenation reactions. Normally gaseous paraffin hydrocarbons or the vapors of normally liquid hydrocarbons are heated to a temperature within the approximate range of 450–700° C. and passed over the granular catalyst at controlled rates which are found by trial to be best for the production of optimum once-through yields of mono-olefinic hydrocarbons, the unconverted materials being fractionated and suitable fractions recycled to further contact with the catalyst. In general, the reactions are favored by low pressures so that subatmospheric pressures are sometimes favorable and in the case of commercial-sized plants only such pressures are employed as are necessary to insure proper flow through the reactors and succeeding equipment. Even in these cases the use of vacuum pumps may sometimes be indicated. The time factors employed are low and of the order of from approximately 1 to 6 seconds actual contact time.

The present process is particularly applicable to the production of propene and butenes from propane and butanes which are present in the overhead fractions from stabilizers operating upon primary cracked distillates. The olefin mixtures thus produced are readily polymerizable by the use of catalysts such as solid phosphoric acid catalysts to produce high antiknock value liquids of gasoline boiling range and in the case of butenes to produce mixtures of octenes which are evidently of predominantly isomeric structure as evidenced by the high antiknock value of the octenes resulting from their hydrogenation.

The following example showing the preparation of a catalyst and its use in dehydrogenating a particular paraffin hydrocarbon is introduced to indicate the practical possibilities of the present process although not with the intention of limiting the scope in exact correspondence with the data presented.

To make the base catalytic material a solution consisting of 284.2 grams of sodium silicate hydrate $(Na_2SiO_3.9H_2O)$ in 1.333 liters of water was added slowly with stirring to 482.86 grams of aluminum chloride hexahydrate $(AlCl_3.6H_2O)$ dissolved in 1.333 liters of water. To the resulting mixture 333 cc. of concentrated ammonium hydroxide solution (Sp.Gr. 0.90) was added, 2.333 liters of water then added and the mixture allowed to stand at room temperature for 18 hours. The mass was then filtered and the filter cake was removed, stirred into a slurry with a solution containing 13.38 grams ammonium chloride and 2.5 cc. concentrated ammonium hydroxide per liter after which the slurry was again filtered, this operation being performed several times. The filter cake was then stirred into a slurry in 2 liters of the ammonium hydroxide-ammonium chloride solution, this last operation being performed four times. The mass was dried, formed under pressure into 6 to 10 mesh granules and finally dried at 932° F., this procedure producing granules in which the ratio of silica to alumina was substantially 1:1.

The above prepared material was added to a solution of stannous chloride containing a sufficient amount of tin so that when the hydroxide was precipitated by the use of sodium hydroxide and the material was washed and calcined there was approximately 8% of stannic oxide present.

The catalyst thus prepared was employed to dehydrogenate normal butane using a temperature of 625° C. substantially atmospheric pressure and a time of contact of 3 seconds. In a single pass under these conditions approximately 25% of the butane was converted to butenes and it was found that there was a very small deposition of carbonaceous material so that the catalyst was effective over a period of 100 hours.

We claim as our invention:

1. A process for treating aliphatic hydrocarbons which comprises contacting the same under dehydrogenating conditions with an alumina-silica composite supporting a minor proportion of an oxide of tin.

2. A process for dehydrogenating paraffin hydrocarbons to produce substantial yields of corresponding mono-olefins therefrom which comprises subjecting the vapors of said paraffin hydrocarbons under dehydrogenating conditions to contact with catalytic material comprising essentially an alumina-silica composite supporting a minor amount of a tin oxide.

3. A process for dehydrogenating normally gaseous paraffin hydrocarbons to produce substantial yields of corresponding mono-olefins therefrom which comprises subjecting said paraffin hydrocarbons under dehydrogenating conditions to contact with catalytic material comprising essentially an alumina-silica composite supporting a minor amount of a tin oxide.

4. A process for dehydrogenating propane to produce substantial yields of propene therefrom which comprises subjecting the vapors of said propane under dehydrogenating conditions to contact with catalytic material comprising essentially an alumina-silica composite supporting a minor amount of a tin oxide.

5. A process for dehydrogenating butane to produce substantial yields of butene therefrom which comprises subjecting the vapors of said butane under dehydrogenating conditions to contact with catalytic material comprising essentially an alumina-silica composite supporting a minor amount of a tin oxide.

6. A process for dehydrogenating mono-olefinic hydrocarbons to produce substantial yields of corresponding di-olefins therefrom which comprises subjecting the vapors of said mono-olefinic hydrocarbons under dehydrogenating conditions to contact with catalytic material comprising essentially an alumina-silica composite supporting a minor amount of a tin oxide.

7. A process for dehydrogenating normal butene to produce substantial yields of butadiene therefrom which comprises subjecting the vapors of said butene under dehydrogenating conditions to contact with catalytic material comprising essentially an alumina-silica composite supporting a minor amount of a tin oxide.

8. A process for dehydrogenating paraffin hydrocarbons to produce substantial yields of corresponding mono-olefins therefrom which comprises subjecting the vapors of said paraffin hydrocarbons at temperatures of the order of 450–700° C., substantially atmospheric pressure, and for times of the order of 0.1 to 6 seconds to contact with catalytic material comprising essentially an alumina-silica composite supporting a minor amount of a tin oxide.

9. A process for dehydrogenating normally gaseous paraffin hydrocarbons to produce substantial yields of corresponding mono-olefins therefrom which comprises subjecting said paraffin hydrocarbons at temperatures of the order of 450–700° C., substantially atmospheric pressure, and for times of the order of 0.1 to 6 seconds to contact with catalytic material comprising essentially an alumina-silica composite supporting a minor amount of a tin oxide.

10. A process for treating aliphatic hydrocarbons which comprises contacting the same under conditions of elevated temperature with an alumina-silica composite supporting a minor proportion of an oxide of tin.

JACQUE C. MORRELL.
ARISTID V. GROSSE.